(12) United States Patent
Larson et al.

(10) Patent No.: US 9,785,610 B1
(45) Date of Patent: Oct. 10, 2017

(54) VISUAL DISPLAY OF VEHICLE WHEEL ASSEMBLY FOR VEHICLE WHEEL SERVICE SYSTEM

(71) Applicant: Hunter Engineering Company, Bridgeton, MO (US)

(72) Inventors: Timothy A. Larson, Ferguson, MO (US); Nicholas J. Colarelli, III, Creve Coeur, MO (US); Michael W. Douglas, St. Charles, MO (US); Steven K. Molbach, Ballwin, MO (US)

(73) Assignee: Hunter Engineering Company, St. Louis, MO (US)

( * ) Notice: Subject to any disclaimer, the term of this patent is extended or adjusted under 35 U.S.C. 154(b) by 1110 days.

(21) Appl. No.: 13/676,773

(22) Filed: Nov. 14, 2012

Related U.S. Application Data

(60) Provisional application No. 61/559,977, filed on Nov. 15, 2011.

(51) Int. Cl.
  *G06F 17/10* (2006.01)
  *G06F 17/00* (2006.01)

(52) U.S. Cl.
  CPC ................... *G06F 17/00* (2013.01)

(58) Field of Classification Search
  CPC . G01M 1/02; G01M 1/28; G01M 1/32; G06F 17/00
  See application file for complete search history.

(56) References Cited

U.S. PATENT DOCUMENTS

| 5,325,472 | A  | * | 6/1994  | Horiuchi ............... G06T 15/20 |
|           |    |   |         | 345/419 |
| 5,915,274 | A  | * | 6/1999  | Douglas ................ G01M 1/02 |
|           |    |   |         | 73/462 |
| 6,178,358 | B1 | * | 1/2001  | Colarelli ............... G01B 21/26 |
|           |    |   |         | 700/16 |
| 6,389,895 | B2 | * | 5/2002  | Colarelli, III ............ 73/460 |
| 6,484,574 | B1 | * | 11/2002 | Douglas ................ G01M 1/02 |
|           |    |   |         | 73/462 |

(Continued)

OTHER PUBLICATIONS

"GSP9700 Series Vibration Control System," 2004, Hunter Engineering Company, 138 pages.*

(Continued)

*Primary Examiner* — Kamini S Shah
*Assistant Examiner* — Russ Guill
(74) *Attorney, Agent, or Firm* — Polster, Lieder, Woodruff & Lucchesi, LC

(57) ABSTRACT

A vehicle wheel service system configured to present an operator with an interactive visual display of vehicle service system components and a virtual model of the actual wheel assembly undergoing service. The interactive visual display includes representations of various parameters associated with the wheel assembly and vehicle service system and enables virtual manipulation of the positional relationship of components such as imbalance correction weights and the tire relative to the vehicle wheel rim, providing a visual representation of the resulting effects on the parameters of the vehicle wheel assembly, and enables viewing of various real-time operations from a safe location away from moving components, as well as visualization of operations prior to implementation.

10 Claims, 9 Drawing Sheets

(56) References Cited

U.S. PATENT DOCUMENTS

| | | | | |
|---|---|---|---|---|
| 6,523,408 | B1* | 2/2003 | Colarelli, III | G01M 17/022 73/460 |
| 6,595,053 | B2* | 7/2003 | Parker | G01M 17/022 73/462 |
| 6,772,626 | B1* | 8/2004 | Engel | G01M 1/225 73/146 |
| 7,881,879 | B2 | 2/2011 | Douglas et al. | |
| 2002/0100321 | A1* | 8/2002 | Douglas | G01M 17/022 73/461 |
| 2004/0165180 | A1* | 8/2004 | Voeller | B60C 11/24 356/139.09 |
| 2005/0210976 | A1* | 9/2005 | Gerdes | G01M 1/08 73/459 |
| 2005/0273229 | A1* | 12/2005 | Steinmeier | G06F 17/211 701/31.6 |
| 2007/0283582 | A1* | 12/2007 | Donner | G01B 11/2755 33/228 |
| 2010/0037473 | A1* | 2/2010 | Schommer | G01B 11/2755 33/228 |
| 2011/0285748 | A1* | 11/2011 | Slatter | G06T 11/60 345/629 |

OTHER PUBLICATIONS

"RFV 2000 Operations Manual," Sep. 25, 2012, Snap-on Equipment, 114 pages.*

"Visualiner 3D1, 3D2 X-Cel Series," Jul. 2012, Snap-on Equipment, 8 pages.*

* cited by examiner

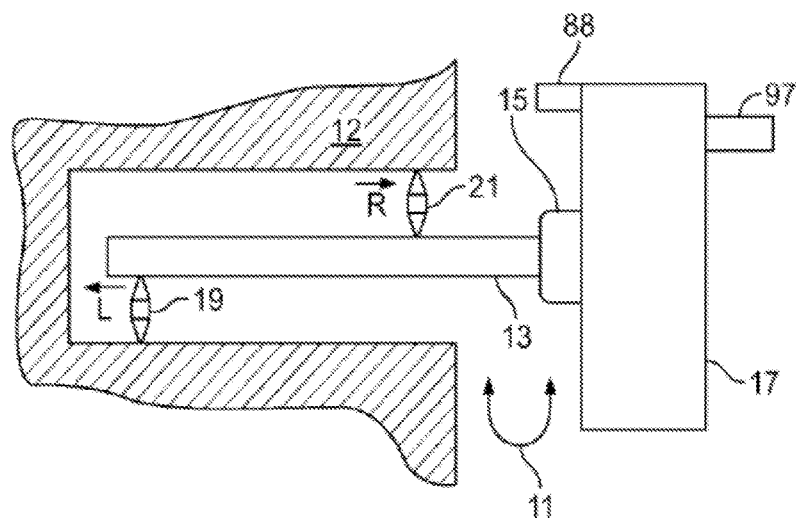
FIGURE 1 - PRIOR ART
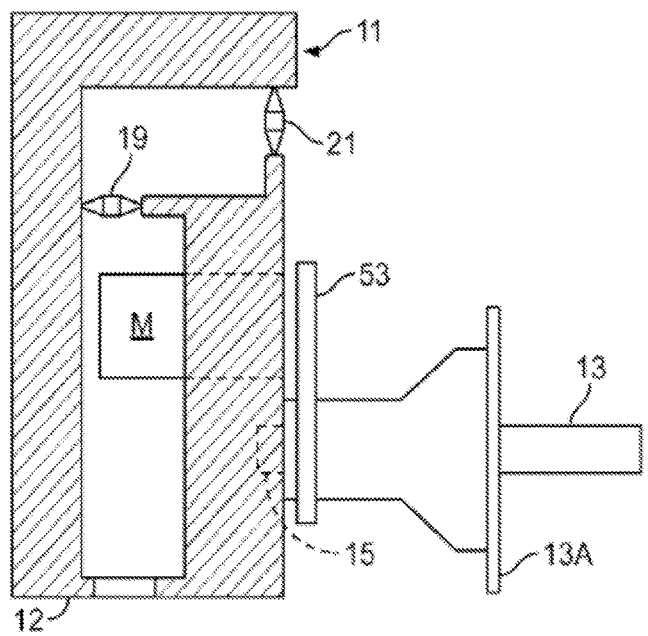
FIGURE 2 – PRIOR ART

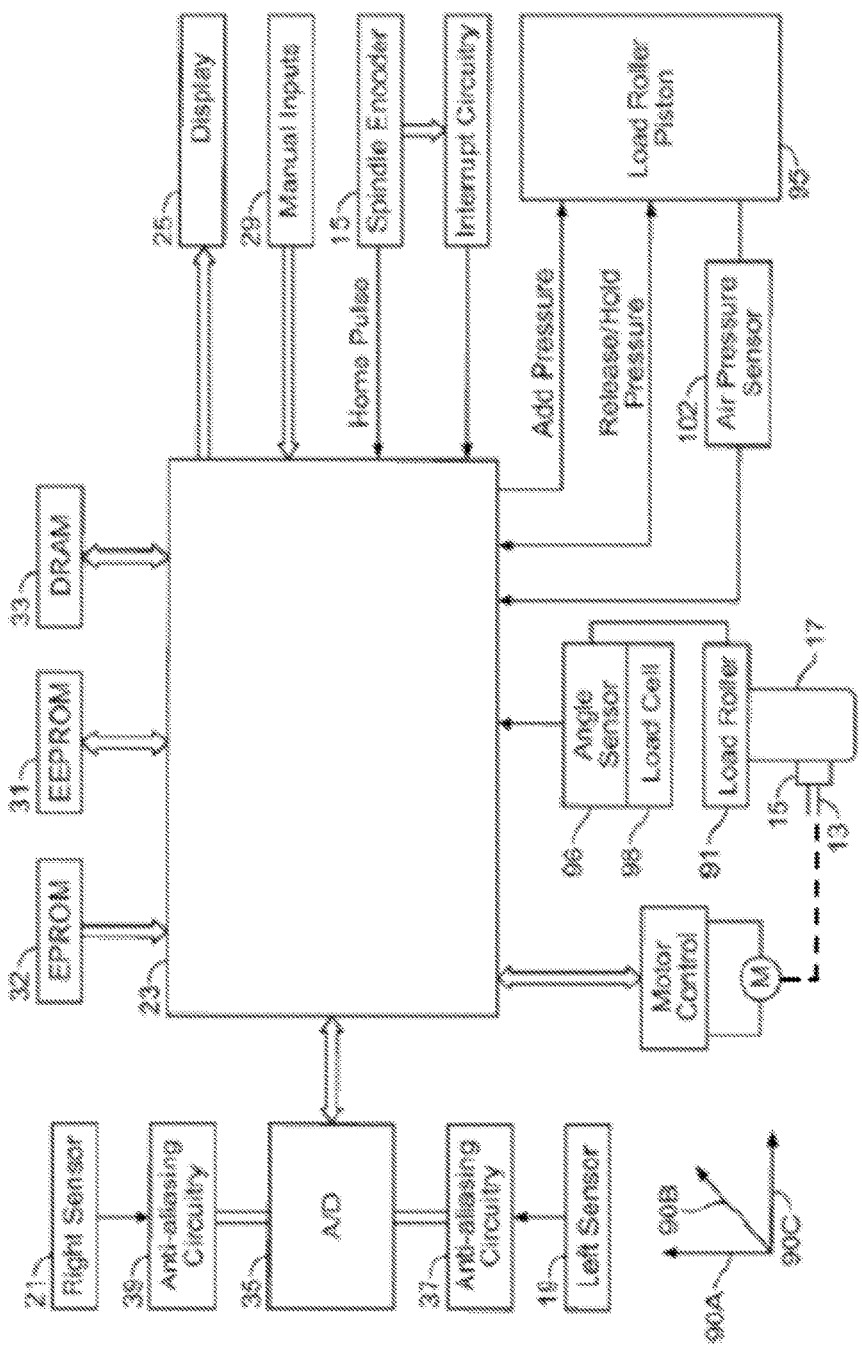
FIGURE 3 – PRIOR ART

VISUAL DISPLAY OF VEHICLE WHEEL ASSEMBLY FOR VEHICLE WHEEL SERVICE SYSTEM

CROSS-REFERENCE TO RELATED APPLICATIONS

The present application is related to, and claims priority from, U.S. Provisional Patent Application Ser. No. 61/559,977 filed on Nov. 15, 2011, which is herein incorporated by reference.

STATEMENT REGARDING FEDERALLY SPONSORED RESEARCH

Not Applicable.

BACKGROUND OF THE INVENTION

The present disclosure is related generally to vehicle wheel service systems, such as vehicle wheel tire changing systems, vehicle wheel measurement systems, and vehicle wheel balancing systems, configured to generate and display an interactive virtual model of an actual vehicle wheel assembly undergoing service to visually illustrate wheel assembly or component runout, imbalance forces, imbalance correction weights, RoadForce™ and other information such as real-time movement and position of service system components during operation of the service system.

Vehicle wheel service systems generally facilitate different tasks associated with off-vehicle maintenance of vehicle wheel assemblies, which consist of a wheel rim and a tire mounted thereon. For example, vehicle wheel balancing systems generally function to measure imbalance forces present in the vehicle wheel assembly. These measured imbalance forces are used to provide an indication to the operator of the condition of the wheel and tire assembly, as well as amounts of imbalance correction weights to be applied in specific axial planes, and at specific radial and rotational positions about the wheel assembly, to compensate for the measured imbalances. Vehicle wheel tire changing systems, in addition to being configured with tools to manipulate a tire relative to an associated wheel rim, can be configured to measure physical characteristics associated with a wheel and tire assembly undergoing a service procedure, such as wheel rim runout, tire out-of-round conditions, or variations in tire stiffness. Additional types of vehicle wheel service systems include vehicle wheel measurements systems which are configured to measure various radial and lateral forces exerted by a rotating wheel assembly consisting of a wheel rim and tire mounted thereon.

While most vehicle wheel balancing systems and tire changing systems provide measured information and guidance to the operator in the form of digital numerical displays, such as by indicating weight amounts for placement at specific locations on the wheel rim, some vehicle wheel service systems attempt to provide the operator with guidance and information via a more intuitive interface. These systems provide a fixed or static display which is representative of a vehicle wheel assembly, and include annotations such as arrows or other markers to indicate the placement locations and amounts for imbalance correction weights or runout, or high and low regions of tire stiffness or Road Force™. However, these fixed displays are not truly representative of the actual wheel assembly which is being measured, and are not sufficiently interactive to enable an operator to easily visualize the effects of lateral or radial runout, measured imbalances, the placement of imbalance correction weight amounts which would result from altering parameters of the wheel assembly, or the effect of changes in the relative mounting of the tire on the wheel rim. Some vehicle wheel service systems acquire data associated with the surface of a vehicle wheel assembly, such as tire tread depth, and project it onto the surface of a wheel-shaped virtual object or static model for display to an operator. While this is a representation of the actual wheel undergoing service, such systems, still lack the ability to manipulate the projected data beyond providing the visual presentation or mapping of the measured or imaged data onto the skin of the static model.

Accordingly, it would be advantageous to provide a vehicle wheel service system with an operator interface including an interactive visual display of a virtual model of the wheel assembly, wherein discrete components of the wheel assembly and interacting elements of the vehicle service system, such as a wheel rim, tire, tools, and imbalance correction weights, are individually modeled and displayed. It would be further advantageous to present these components in a form which includes visual representations of various characteristics, such as runout, vibration, imbalance parameters, imbalance correction weight types, imbalance correction weight layouts, imbalance correction weight arrangements, imbalance correction weight placement locations, and tool positions.

Of further benefit to a vehicle service system operator would be to provide a visual display of a virtual model of the wheel assembly and interacting elements of the vehicle service system which is sufficiently interactive to enable an operator to manipulate the relationships of the virtual model components, such as the rotational position of the tire and the imbalance correction weights relative to the vehicle wheel rim, in order to view a visual representation of the resulting effects of the manipulation on overall runout, non-uniformity vibrations, force variations, and imbalance of the actual vehicle wheel assembly prior to actually adjusting the actual vehicle wheel assembly or installing imbalance correction weights.

It would also be further advantageous to enable the operator to view a real-time visual representation of the interactive components of the service system, such as articulated tools, as they are utilized during a service procedure from a safe location, away from automated moving components and any associated danger zones.

BRIEF SUMMARY OF THE INVENTION

Briefly stated, the present disclosure provides a computer implemented method for generating an interactive visual display of wheel assembly parameters on a vehicle wheel service system to facilitate a wheel assembly service procedure, such as matching a rotational position of the tire relative to the rim. Initially, wheel assembly parameters, such as radial forces from the tire and rim are determined. The resulting force data is applied to a virtual model consisting of discrete components representative of the elements of a vehicle wheel assembly. The virtual model is rendered and presented as a visual display of the actual wheel assembly to the operator in an interactive form. Optionally, the visual display may include representations of vehicle service procedure outcomes, such as a display of a the placement of imbalance correction weights or a change in the relative rotational mounting position for the tire with respect to the wheel rim to minimize a resulting vibration harmonic or spectral density analysis value.

In an embodiment of the present disclosure, a vehicle wheel service system is configured to provide an interactive display of a virtual model representative of an actual vehicle wheel assembly undergoing service. The virtual model provides an operator with a means by which various components associated with the vehicle wheel assembly may be altered and the resulting outcome observed. For example, a relative rotational mounting position of a tire with respect to a wheel rim may be virtually manipulated, either manually by the operator or automatically by the vehicle wheel service system, to present a visual representation of the wheel assembly and/or imbalance forces of the wheel assembly at any relative rotational mounting position of the tire with respect to the rim. Additional virtual components within the displayed virtual model representative of imbalance correction weights may be virtually manipulated, either manually by the operator or automatically by the vehicle wheel service system, to provide a visual representation of the placement location and arrangement of the imbalance correction weights for installation on the vehicle wheel assembly, together with the resulting effect on an imbalance of the wheel assembly.

In a further embodiment, the present disclosure provides a vehicle wheel balancer system with an interactive visual display. The vehicle wheel balancer system further includes a rotating shaft adapted for receiving a wheel assembly, a sensor assembly for measuring rotation of the shaft, and at least one vibration sensor assembly disposed within the vehicle wheel balancer system for measuring vibration of the wheel assembly as the wheel assembly is rotationally driven by a motor operatively connected to the shaft. Optionally, an integrated load roller is positioned for selectively applying a generally radial force to the wheel assembly on the shaft. Additional sensors within the wheel balancer system measure variations of the radial forces and runout during rotation of the wheel assembly. A control circuit within the vehicle wheel balancer system is operatively coupled to the various sensors and configured to receive measurement data from the sensors, and to generate an interactive virtual model of the balancer system and vehicle wheel assembly for presentation to an operator via the interactive visual display, together with representations of the various measured forces and/or imbalances.

In an additional embodiment of the present disclosure, a vehicle tire changing system is configured to utilize and display of virtual model of a vehicle wheel assembly and/or components of the vehicle tire changing system to convey information to an operator. The vehicle tire changing system is configured to provide a virtual model in which a virtual wheel assembly is manipulated to mount, demount, or reposition a tire relative to a wheel rim, enabling an operator to visualize the procedural steps and the resulting outcome. The virtual model may incorporate components which illustrate the mechanical components of the tire changing system for manipulating the tire and wheel rim. The virtual model display is manipulated by a suitably configured processor of the vehicle tire changing system to move various displayed components within the virtual model, providing the operator with a visual guide to follow when positioning manually-actuated components during an actual wheel service procedure. Positional data associated with various mechanical components of the tire changing system is communicated to the processor, which is configured to alter the virtual model display to render an accurate representation of real-time positioning and movement of the illustrated mechanical components, enabling the operator to view a current procedure from a safe location away from moving parts. The virtual model display may be further manipulated by the processor to provide a combination of guidance steps and real-time positioning/movement, enabling the operator to proceed through the steps of a wheel service procedure, while observing both the actual mechanical components and the virtual model display.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1 is a schematic diagram of a prior art wheel balancer;

FIG. 2 is another schematic diagram of prior art wheel balancer of FIG. 1;

FIG. 3 is a schematic diagram of prior art control circuitry that may be used with a wheel balancer;

Corresponding reference numerals indicate corresponding parts throughout the several figures of the drawings. It is to be understood that the drawings are for illustrating the concepts set forth in the present disclosure and are not to scale.

Figure 4:
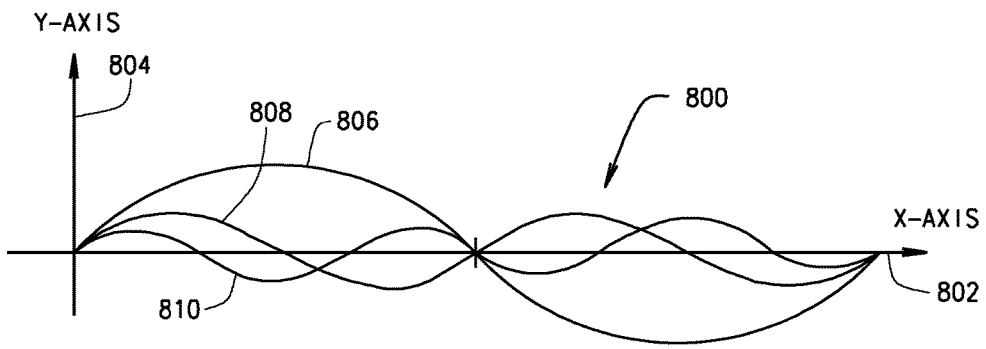
FIG. 4 is a graph of exemplary wheel assembly vibration harmonic components with respect to phase.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure. The present invention is intended for use with a variety of vehicle service systems, including, but not limited to, vehicle wheel balancer systems and vehicle tire changing systems. One of ordinary skill in the art will recognize that vehicle service systems other than the specific embodiments disclosed herein may similarly utilize a display of an interactive "live" or "real time" virtual model of a vehicle wheel assembly, vehicle service system components, and associated parameters to communicate information to an operator as disclosed herein, and are considered to be within the scope of the present disclosure.

Turning to the figures, FIG. 1 is a schematic diagram of a vehicle service system in the form of a prior art vehicle wheel balancer 11. The particular balancer shown is illustrative only, since the particular devices and structures used to obtain imbalance, runout, and force variation information could readily be modified by one of ordinary skill into different configurations to achieve the same functionality. The vehicle wheel balancer 11 includes a rotatable shaft or spindle 13 driven by a suitable drive mechanism such as a motor M and drive belt 53 (shown in FIG. 2, as another exemplary schematic diagram of the vehicle wheel balancer 11). A shaft encoder 15 coupled to shaft 13 is configured to provide speed and rotational position information to control circuitry and processor 23 (shown in FIG. 3).

During the operation of wheel balancing, at the end of spindle 13, a wheel assembly 17, consisting of a wheel rim and tire, or just a wheel rim, under test is removably mounted for rotation with a spindle hub 13A (shown in FIG. 2) of the spindle 13. To determine wheel assembly imbalance, the vehicle wheel balancer 11 includes at least a pair of piezoelectric type imbalance force sensors 19 and 21 (or other suitable sensors such as strain gauges) coupled to the spindle 13 and mounted on the balancer base 12.

When a wheel assembly 17 is in an unbalanced condition, it vibrates in a periodic manner as it is rotated on the spindle shaft 13, and these vibrations are transmitted through the spindle 13. Imbalance force sensors 19 and 21 are responsive to these vibrations of spindle 13. In one embodiment, imbalance force sensors 19 and 21 generate a pair of analog electrical signals corresponding in phase and magnitude to the vibrations of the spindle at the particular transducer locations. These analog signals are input to control circuitry (shown in FIG. 3) described below, which determines the required magnitudes and positions of correction weights to correct the imbalance. Those of ordinary skill in the art will recognize that different types of sensors which are sensitive to vibrations, as well as sensors generating digital signals, may be utilized in place of force sensor 19 and 21.

A schematic diagram of exemplary control circuitry that may be used with a prior art vehicle wheel balancer 11 (such as shown in FIGS. 1 and 2) is show in FIG. 3. In this exemplary embodiment, vehicle wheel balancer 11 includes a spindle encoder 15, and a suitably programmed computer or processor 23. The processor 23 is configured with software instructions to perform signal processing on the output signals from imbalance force sensors 19 and 21 to determine wheel imbalance and other conditions of wheel assembly 17. The processor 23 is communicatively coupled to, and is configured to control, a display 25 which provides information to a user, to control motor M through motor control circuitry 27, and to monitor a rotational position of the spindle 13 from encoder 15.

Vehicle wheel balancer 11 includes manual inputs 29 (such as a keyboard and parameter input data dials and/or a touch-screen display) which are operatively connected to the processor 23. In the exemplary embodiment, the processor 23 has sufficient capacity to control, via software instructions, all the operations of the vehicle wheel balancer system, in addition to controlling the associated display. The processor 23 is connected to memory such as EEPROM memory 31, EPROM program memory 32, dynamic RAM (DRAM) memory 33, or other suitable data storage device, such as a flash drive. EEPROM memory 31 is used to store non-volatile information, such as calibration data, while processor 23 uses DRAM 33 for storing temporary data. The processor 23 is also connected to an analog-to-digital converter (ADC) 35 if necessary to receive analog signals from the sensors 19 and 21, which may be routed through anti-aliasing circuitry 37, 39 (if needed) to the ADC 35.

The vehicle wheel balancer 11 may further include a load roller 91 positioned adjacent to the wheel assembly 17 mounted to the spindle, and articulated so that it may be positioned in engagement with a tire of a wheel assembly 17, so as to measure loaded runout of wheel assembly 17. Three contact forces, which are defined as a radial force, a lateral force, and a tractive force, are present between the wheel assembly 17 and the load roller 91 when engaged with the wheel assembly 17. In one exemplary configuration, the load roller 91 is carried on a shaft journaled on an L-shaped arm designed to pivot about the axis of a shaft. The processor 23 controls the arm to pivot in order to place load roller into engagement with the tire by actuating, for example, an air cylinder 95 or an air bag actuator. Air pressure to cylinder 95 can be variably adjusted by the processor 23, with air pressure feedback provided by a sensor 102. The feedback enables precise load roller forces to be generated and enables the processor to detect pressure problems and remove air pressure if needed. Rotation of the shaft 92 is sensed by a sensor 96 and the amount of rotation is transmitted to processor 23.

By applying a force or load to the tire with the load roller 91 and monitoring the output of sensor 96, the processor 23 can determine the loaded runout of wheel assembly 17 as a combination of rim runout and tire stiffness using the output from the sensor 96. In an alternative embodiment, the load roller 91 is fixed and a load cell 98 coupled to load roller 91 is monitored to provide a signal to processor 23 indicative of the force applied to a wheel assembly 17. Alternatively, runout of the wheel assembly 17 may be measured by means other than a load roller/sensor combination, including non-contact sensors systems such as optical or ultrasonic systems, which observe the surfaces of the wheel assembly during rotation and extract measurement data from the observed images or reflected signals.

In addition, the processor 23 is coupled to sensors for measuring the axial and radial runout of the inside and outside rim edges of the wheel rim of assembly 17, such as at the circumference of the tire bead seats. Output from these sensors is representative of radial and axial wheel rim runout. Additional information, such as the first harmonic of radial wheel rim runout (both angle and magnitude) may be determined by the processor 23 using a suitable procedure such as digital filtering, discrete Fourier transform (DFT), or spectral density analysis (SDA). The same process can be performed to determine axial runout for each edge or bead seat of the wheel rim. With both tire and wheel rim roundness measurements, processor 23 is able to compare the measured values with stored wheel rim and tire runout specifications to identify discrepancies or deviations which exceed permissible tolerances.

To generate or render a virtual model 200 of the present disclosure which is representative of the vehicle wheel assembly 17, a processing system of a vehicle wheel service system, such as processor 23 of a vehicle wheel balancer 11, is configured with suitable software instructions to utilize the measured and/or input parameters for the vehicle wheel assembly 17 to model discrete components for presenting a visual display 201 on the display device 25 to an operator. The discrete components may include, but are not limited to, the tire, the wheel rim, individual imbalance correction weights, valve stems, installed TPMS sensors, wheel support structures, and vehicle service system articulated tools such as tire bead breaker arms or tire manipulation tools. By incorporating the measured and/or input parameters, the processor 23 is configured to render the virtual model 200 for the visual display 201 while representing the various features and characteristics of the actual vehicle wheel assembly 17 undergoing service. The virtual model 200 may emphasize specific elements or selected regions of the wheel and tire assembly 17 by incorporating text, scaling, shading, transparency, color, or surface deformations on the visual display 201, such as shown at 202a-202i in FIG. 5 and FIG. 7. Alternatively, information can be displayed in visual proximity to the rendered virtual model 200 of the vehicle wheel assembly 17, such as in the form of a surrounding "ring" (as at 203A in FIG. 7) or indicator arrows (as at 203B in FIG. 9). The virtual model is rendered and displayed by the processor 23 in such a form that it may be manipulated either by the processor or by the operator, to alter one or more of the displayed components individually, such as by changing a size, shape, color, or other characteristics, as well as to add, remove, or reposition displayed components. In addition to illustrating the vehicle wheel assembly 17, the virtual model may be utilized to illustrate various components of the vehicle service system interacting with, or in proximity to, the vehicle wheel assembly 17. For example, by providing a visual display 201 which includes a component representation of an installed TPMS sensor on a vehicle wheel assembly, an operator may monitor the position with the virtual model 200 of various wheel rim and tire manipulating tools in relation to the position of the installed TPMS sensor in order to avoid contact there with, even when the actual TPMS sensor is obscured from the operator's view.

Those of ordinary skill in the art will recognize that the manipulation of the virtual model elements or components individually within the virtual model 200 is separate and distinct from the process of altering a user's viewpoint of a static representation, such as by three-axis movement of a simple static bit map representation of a wheel assembly, and enables the processor 23 to provide an operator with a visual display of current conditions associated with the actual vehicle wheel assembly 17, as well as expected conditions which may result from a change to the vehicle wheel assembly 17 or the surrounding environment.

For example, with suitable program instructions, when the measured values and previously stored wheel rim and tire runout specifications do not match for a vehicle wheel assembly 17 undergoing service, the processor 23 can calculate a suggested remount orientation of the tire relative to the wheel rim to minimize or reduce the total loaded runout. The processor 23 is configured to selectively alter the visual display 201 of the virtual model 200 to illustrate the suggested remount orientation of the tire relative to the wheel rim, along with a visual representation of the residual loaded runout which would remain after the tire remount orientation is changed relative to the wheel rim. For example, the processor 23 may be configured to present a visual display of the virtual model 200 in a form wherein the runout present in the wheel rim is visually exaggerated (i.e. the rim is shown out-of-round as at 204 in FIGS. 7 and 8), together with an exaggerated or emphasized deformation of the tire representation to provide a visual illustration of the relationship between the "high" and "low" points of the rim and tire stiffness. The rim runout may be represented as the average of the lateral and radial runout values measured at the inner and outer rim edges, or the processor 23 may be configured to provide an associated display, as at 300 in FIG. 7, which is representative of the measured runout at each rim edge or lip individually. The processor 23 may be programmed to include an additional component in the display 201, to identify the net effect of the tire and rim combination at an illustrated rotational orientation of the tire relative to the rim.

In an alternative embodiment, the processor 23 is configured with suitable software instruction to calculate match-mount magnitudes and phase angles of a tire and wheel rim in a wheel assembly 17, using an algorithm such as a Spectral Density Analysis (SDA), rather than individual DFTs for each harmonic alone. Spectral Density Analysis weights and biases multiple harmonics, not just the Radial First Harmonic (R1H). Using SDA during match mounting accounts for the magnitude and phase angle of multiple harmonics into a single measurement value. Prior art systems, such as the GSP9700 vehicle wheel balancer system manufactured and sold by Hunter Engineering Company of Bridgeton, Mo., typically utilize only the R1H to determine optimal tire/wheel matching.

An exemplary graph 800 of vibration harmonic components present in a vehicle wheel assembly with respect to phase is shown in FIG. 4. As described in more detail in U.S. Pat. No. 7,881,879 to Douglas which is herein incorporated by reference, the graph of FIG. 4 includes an x-axis 802 graduated in units representative of the circumferential distance about the wheel assembly, a phase angle, or time that is relatable to the rotational speed of the wheel assembly. The y-axis 804 is graduated in units of vibration power level. A trace 806 illustrates a radial first harmonic (R1H), while a trace 808 illustrates a radial second harmonic (R2H), and a trace 810 illustrates a radial third harmonic (R3H). Essentially, the SDA measurement that takes into account the energy produced by multiple harmonics present in a vehicle wheel assembly. In the exemplary embodiment, an SDA algorithm is configured to bias the overall tire and wheel assembly magnitude towards the most resonant frequency of the tire and wheel assembly that affects vehicle suspension resonance. Such resonant frequency may be empirically derived or may be based on manufacturer or other determination or analytical derivation. Typically, the resonant frequency is biased towards the R1H. An SDA algorithm is an effective use of multiple harmonics as a whole in determining match mounting in tire and wheel assemblies. The SDA algorithm used for match mounting biases towards the harmonic that has the highest magnitude and may raise the magnitude and change the matching relative angle of the rim and tire when match mounting, compared with R1H matching. The effects in comparison to a pure R1H would be that the overall reading of the SDA matching measurements would be higher than a pure R1H measurement if there are higher order harmonics effecting the overall measurements. This weights the SDA measurement higher than the traditional R1H when used for diagnosis and replacement use.

As various forces or imbalance measurements are acquired by the vehicle wheel balancing system 11, the processor 23 is configured with suitable software instructions to optionally present them to the operator in virtual model 200 in the form of the interactive visual display 201. This visual display 201 may take the form of a two dimensional graphic (such as FIGS. 5 and 7), or a scaled three-dimensional model representation of a vehicle wheel assembly, including a wheel rim and tire mounted thereon (such as FIGS. 6 and 8). Various graphical user interface components such as buttons, menus, and pop-up windows, may be included within the visual display 201. The visual display may consist of a preconfigured wheel assembly model which is altered to accommodate the measurements to be displayed, or may be uniquely rendered "on the fly" by the processor 23 of the vehicle service system in response to wheel assembly parameters input by an operator or acquired by measurement. The virtual model 200 may optionally include representations of the wheel rim spokes, which may be either illustrated generically (i.e., 3 spoke, 4 spoke, 5 spoke configurations, etc.), modeled from an established database of wheel rim configurations, or shown as modeled from actual measurements/observations of the wheel rim acquired by the wheel balancing system, such as through one or more imaging sensors or electro-mechanical measurement sensors (not shown).

Figure 5:
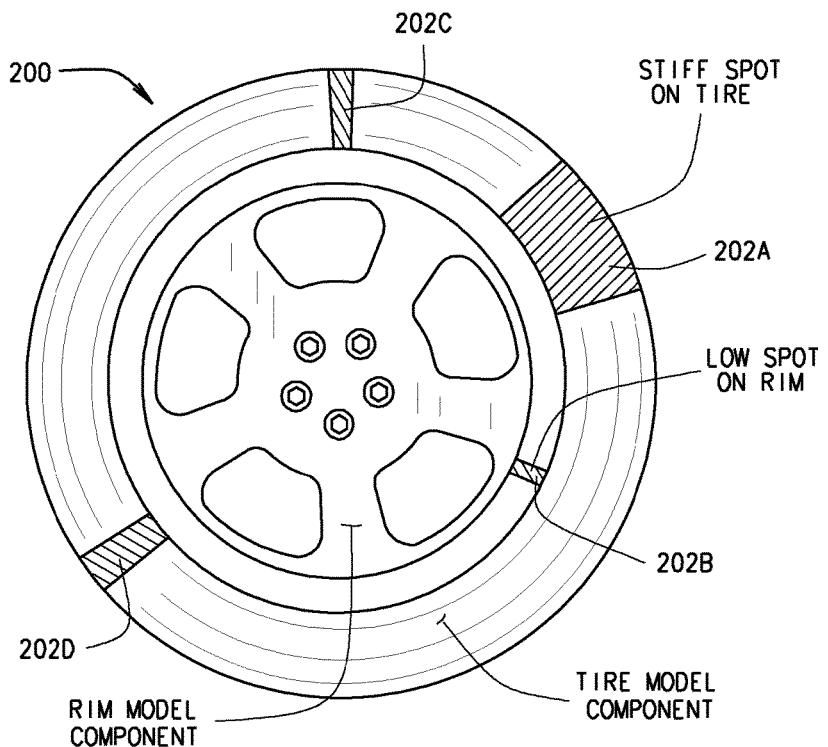
FIG. 5 is a display of a wheel assembly model illustrating a rotational position of a tire stiff spot and a rim runout high spot as measured on a vehicle wheel assembly.
Figure 7:
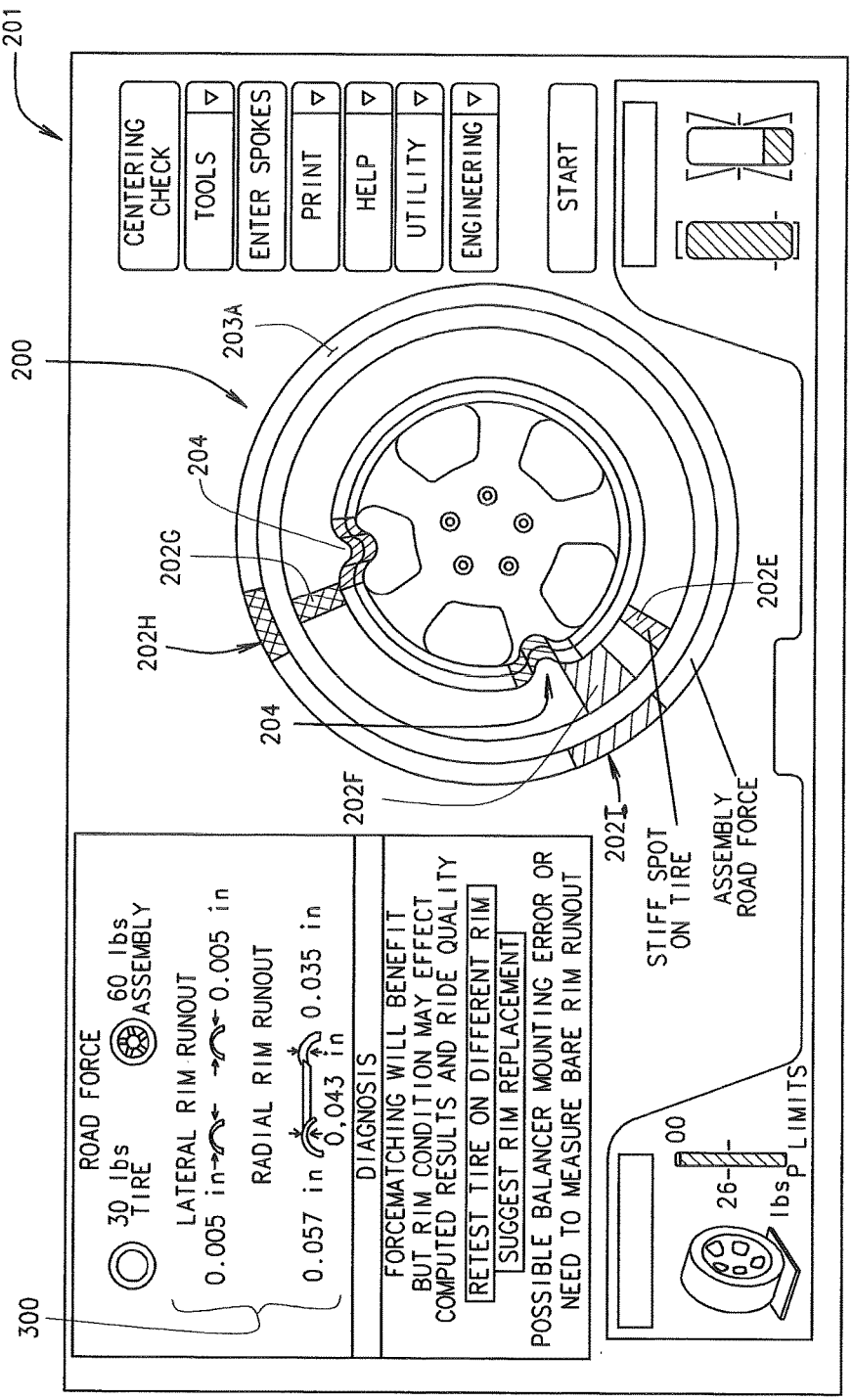
FIG. 7 is a screenshot display of a vehicle wheel assembly model including wheel assembly RoadForce™ information displayed on a ring surrounding a tire model, together with a representation of excessive rim runout.
Figure 8:
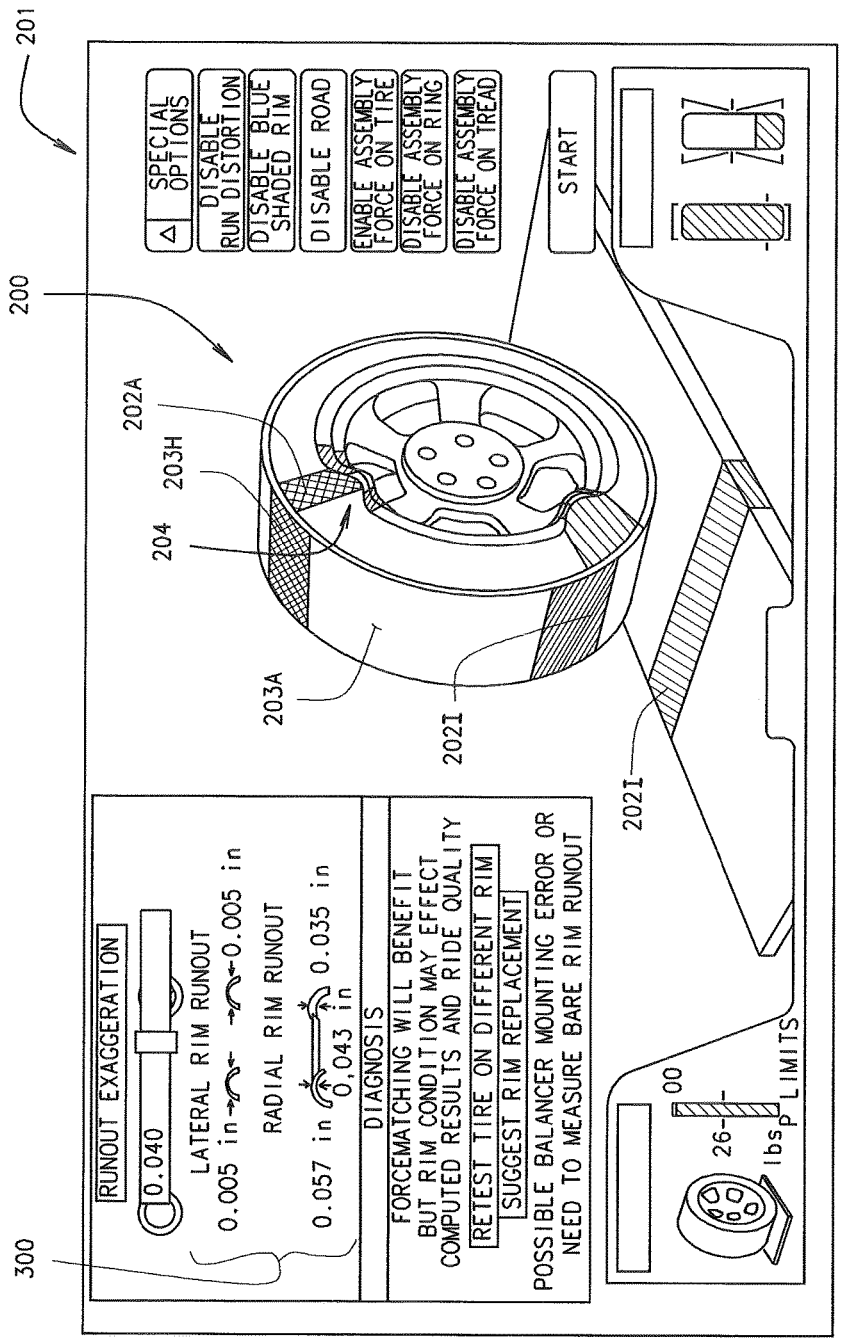
FIG. 8 is a screenshot display of a vehicle wheel assembly model including RoadForce™ and rim runout information presented in a perspective view of the wheel assembly and an associated road surface.

The processor 23 is configured with suitable software instructions to apply representations of the forces, imbalance measurements, or runout measurements to the discrete components of the virtual model 200 presented in the visual display 201 to an operator, in a manner which illustrates the actual vehicle wheel assembly 17 undergoing testing by the vehicle wheel service system. These representations may, as shown in FIGS. 5, 7, and 8, take the form of variations in shape (i.e., roundness), hue, shading, or color of elements of the model to represent graduated high and low regions of RoadForce™, imbalance, runout, forces, or other measurements.

Where the virtual model 200 includes representations of measurements associated with the wheel rim, and representations of measurements associated with the tire, the processor 23 may further be configured to provide a representation of the resulting combination of measurements from both the rim and tire under either loaded or unloaded operating conditions, allowing an operator to visualize the effect of mounting (or re-mounting) a tire at a particular rotational position about the wheel rim of the vehicle wheel assembly 17. This may be done either by manipulating the tire and rim components of the virtual model 200, or by providing an additional component in the virtual model 200, such as a annular ring 203a shown spaced apart from, and about, the circumference of the wheel rim and tire assembly 17 (as shown in FIG. 7), upon which the combined forces are represented (i.e., a RoadForce™ ring). As shown in FIGS. 7 and 8, measurements associated with the tire, the rim, and the combination thereof, may be presented in the virtual model 200 by identifying text, varying shapes, or in different hues, shading, or colors to facilitate distinction there between, and the representation of the tire and wheel rim may be scaled as necessary to allow for the display of the measurements. Optionally, as seen in FIGS. 7 and 8, the surface of the tire or rim as shown on the model may be intentionally distorted (as at 204) by the processor 23 from a circular form to represent positive and negative variations in the measurements of forces or runout about the tire circumference. The operator may be provided with an interactive means, such as a selectable slider, to exaggerate or reduce the scale of distortion for ease of viewing.

As an alternative to displaying measurements associated with a wheel rim directly on a visual representation of the wheel rim and tire assembly, the processor 23 may be configured to display a separate model or representation of the wheel rim alone, with the associated measurements illustrated there upon, adjacent to, and in rotational sync with, a visual representation of the wheel assembly. The visual display of the wheel rim may consist of a preconfigured wheel rim model which is altered to accommodate the measurements to be displayed, or may be uniquely rendered "on the fly" by the processor in response to wheel rim parameters input by an operator or acquired by measurement. The separate model or representation of the wheel rim may be utilized to provide a visual an indication of the amount of runout present in the wheel rim at any point about the circumference. In addition to illustrating the measurements associated with the wheel rim model or representation by shading, hue, or color, the shape of the wheel rim, as visually presented, may be distorted from that of a perfect circle to further or alternatively represent regions of positive or negative runout as measured by the vehicle wheel service system.

The visual display 201 of the virtual model 200 presented to the operator by the processor 23 of the vehicle wheel service system can be configured by the processor 23 via suitable programming to provide the operator with useful information other than visual representations of measurements and forces associated with a vehicle wheel assembly undergoing a service procedure. For example, as seen in FIG. 6, the visual display may be configured to provide the operator with scaled and real-time information associated with the placement location and arrangement of imbalance correction weights 206a-c onto the vehicle wheel assembly 17 to compensate for measured imbalances or forces.

The presentation of components 206 representing imbalance correction weights in the virtual model 200 may provide realistic representations of actual shapes and styles of the particular imbalance correction weights employed by, or available to, the operator. The imbalance correction weight representations can be scaled in three-dimensions, and as shown in FIG. 6, can be positioned in the visual display of the virtual model 200 at a location which corresponds to the placement position on the vehicle wheel assembly as determined by the processor 23. In this manner, the virtual model 200 provides the operator with a visual guide as to the proper placement, arrangement, and orientation of the imbalance correction weights on the physical vehicle wheel assembly 17.

Preferably, the processor 23 of the vehicle service system is provided with access to stored data corresponding to imbalance correction weight shapes and styles to which the operator has access to during a vehicle wheel balancing procedure. These weight shapes and styles may include tape weights, for placement on the smooth inner surfaces of a wheel rim, clip-on weights for attached to the wheel rim edge circumferential lips, and patch weights for placement on the inner surfaces of a tire installed on the wheel rim. The stored data for each type of imbalance correction weight may include but is not limited to, correction factors to account for known measures of inaccuracy in the manufacture of the imbalance correction weight type, as well as other weight-specific data such as center of mass and physical dimensions which may be utilized in calculations of the proper placement location on the vehicle wheel rim. As is seen in FIG. 6, in addition to presenting the operator with a display in the virtual model 200 of the currently selected type/style of imbalance correction weights positioned at the appropriate locations on the vehicle wheel assembly 17, the processor 23 may be configured with software instructions to render representations (as seen at 206a, 206b, and 206c) of placement layouts for alternate types/styles of imbalance correction weight which are known to be available to the operator, thereby providing the operator with a visual representation of available choice in the event one of the alternate weight types or styles is selected for application to the vehicle wheel assembly.

Figure 6:
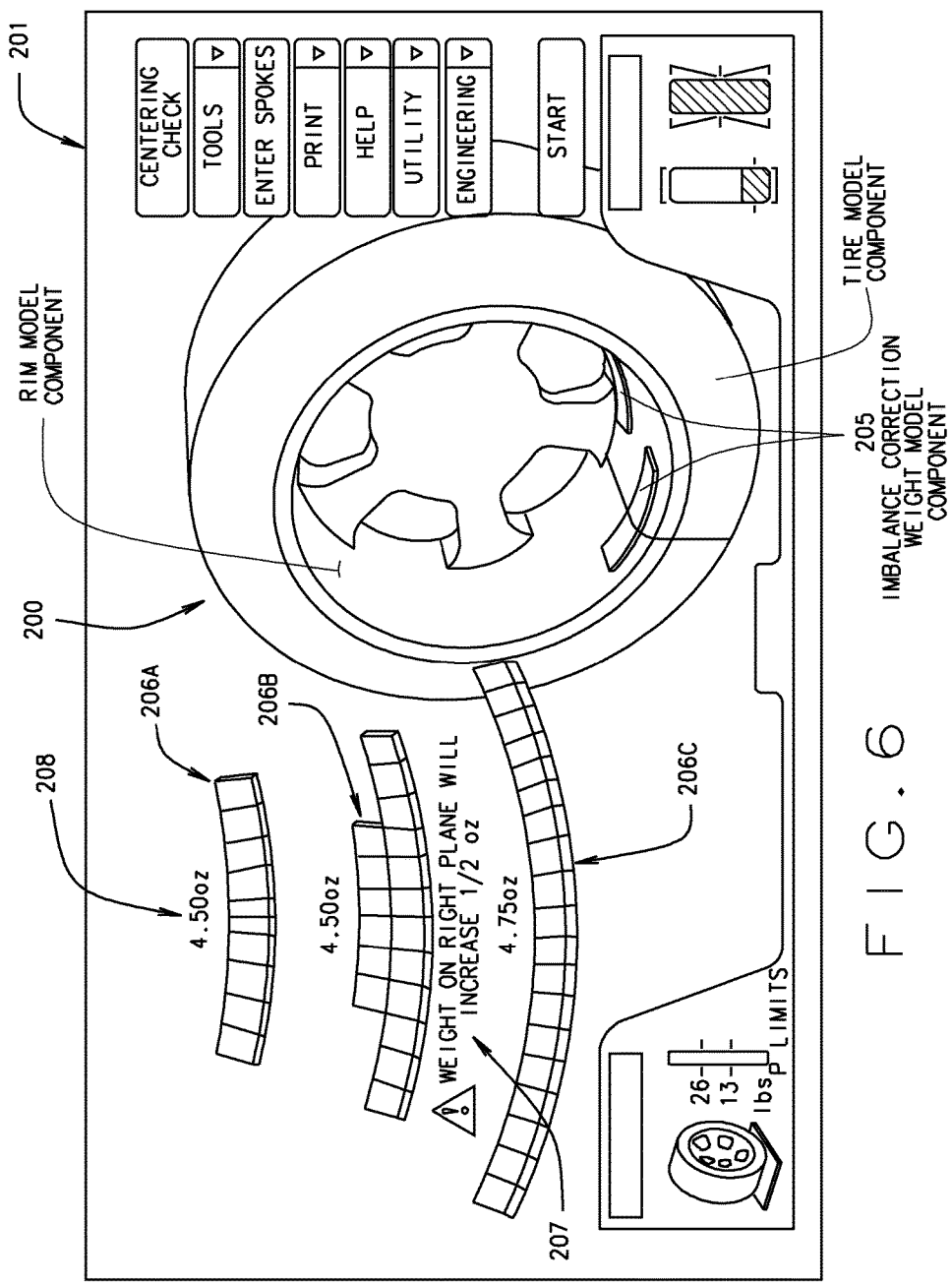
FIG. 6 is a screenshot display a wheel assembly model, including representations of imbalance correction weight placement locations, arrangements, and configurations for different styles of imbalance correction tape weights.

As an alternative to, or in conjunction with the display of imbalance correction weights 206, the processor 23 may be configured to present the operator with a numerical values 208 overlaid onto the visual display of the vehicle wheel assembly 17, representing the actual amounts of imbalance correction weight to be placed at specific locations about the vehicle wheel assembly, such as shown in FIG. 6.

Once an operator has identified to the processor 23 the specific type of imbalance correction weight which will be utilized to compensate for a measured imbalance in a vehicle wheel assembly 17, the suitably configured processor 23 can provide the operator with a visual representation in the visual display 201 of various weight placement options which are specific to the selected type of imbalance correction weight. For example, upon the selection of a tape-style imbalance correction weight, the processor 23 may be configured to account for physical parameters of the imbalance correction weights (such as mass, density, mass-per-length, center of, gravity, length, height, and width) when identifying the amount of imbalance correction weight, and an associated placement location arrangement or orientation, to be applied to a vehicle wheel assembly to compensate for a measured imbalance. The processor 23 can further be configured to present to the operator within the visual display 201, one or more optimal arrangements for the actual placement of the identified type of imbalance correction weights on the vehicle wheel assembly (See: 206a-c at FIG. 6). If the operator changes the style of imbalance correction weight to be applied, the processor 23 will recalculate the imbalance correction weight parameters if necessary, and update the visual display 201 to account for the change in selection on the wheel assembly. The updated display may illustrate placement of the weights in a single row (as at 206a and 206c), or in multiple rows (as at 206b), depending upon the calculations carried out by the processor 23. The processor 23 is preferably configured to compensate for the effect of the curvature of the wheel surface when applying long rows of imbalance correction weights, and/or a shift in the effective placement plane when placing multiple rows of weights. A suitable warning may be presented to the operator (as at 207 in FIG. 7).

Compensating for wheel curvature, and effective placement plane shifts of the actual imbalance correction weights to be applied, addresses some sources of a long standing problem of "chasing weights" (small additional amount of weight called out for placement onto a wheel assembly by a wheel balancing system after applying the initially displayed weights and subsequently performing a check-spin re-measurement to verify that the wheel assembly is balanced) when adhesive weights are used.

Conventional vehicle wheel balancers compute imbalance correction weights using an assumed physical geometry of the adhesive-style correction weights that will be used. However, there are many different types of adhesive weights from different manufacturers, each having different physical configurations. For example if the width of the adhesive weight strip varies from the width assumed by the vehicle wheel balancer system by only a few millimeters, the operator will unknowingly displace the weight strip from the lateral placement position on the wheel rim that the processor 23 expects (the assumed lateral distance to the center-of-gravity of the placed weight is in error). This lateral placement position is effectively one of two "weight correction planes" used by vehicle wheel balancers to compute imbalance correction weights that compensate for both dynamic and static imbalance in the vehicle wheel assembly. These weight correction planes are identified to the balancer processor either by the operator or by automatic selection after surveying a portion of the wheel rim surface profile. If one of the planes changes position and the associated imbalance correction weights are recalculated, the amounts and angle placements for imbalance correction weights in the second correction plane can be affected (not just the weight residing on the plane that moved). By the same process, if one of the imbalance correction planes differs from the assumed imbalance correction plane because of the variation in an imbalance correction weight width as described above, the displayed weights and angles for both correction planes could be in error.

Conventional vehicle wheel balancers are programmed with a fixed representation as to how adhesive weights will be placed on the wheel rim at the identified locations. For example, an additional, and even more significant error in center-of-gravity lateral distance is introduced when the weight amount required for a strip of imbalance weight pieces (i.e., "chiclets") exceed the amount available in a complete strip of chiclets (a complete strip of typical U.S. market weights is 3 ounces, consisting of twelve ¼ oz chiclets). To satisfy larger imbalance correction weight callouts, a technician will often place two strips of imbalance correction weights side-by-side along a line parallel to the wheel assembly axis of rotation instead of end-to-end about the wheel rim circumferential surface in order to reduce the lengthy appearance of the large amounts of weight chiclets or simply because it is easier to place two strips each at required placement angle on the wheel assembly. This act significantly shifts the physical lateral distance into the wheel rim of the total weight arrangement's physical center of gravity when compared to the assumed weight plane location. Instead of the assumed distance to the center of the weight strip's width being used, the actual center of gravity is shifted to the point where the two strips are butted against each other. Conventional vehicle wheel balancers weight calculations are based on the former assumption, so a chase-spin will likely follow as the vehicle wheel balancer attempts to compensate for the perceived mis-placement of the imbalance correction weights.

Mass-per-length density variation of the applied imbalance correction weights is yet another source of error. Adhesive weight strips of different materials can have vastly different overall lengths of chiclets for the same amount of total weight (example: zinc vs. lead) and each will have different effects on imbalance correction for the same value of marked total weight applied. The longer the strip of weight is, the less effective it becomes at creating the counteracting force that would occur if that same amount of weight was all concentrated at the identified point of intended placement on the wheel assembly. This is because as the weight strip gets longer, the more the curvature of the imbalance correction weight on the curved inside surface of the wheel rim forces the weight's effective center of gravity to shift radially inward towards the centerline of rotation of the wheel (effectively it appears to the balancer as if the operator has applied less weight than the total marked amount of the chiclets).

A shift in the radial position of an imbalance correction weight effective center of gravity may also occur if the operator utilizes an imbalance correction weight having a greater vertical dimension then the balancer system expects, such as by mixing imbalance correction weights from different manufacturers or of different styles.

All of the aforementioned sources of error may be additive. For the case of placing a very long strip of weights end to end vs. multiple rows side by side, both the assumed lateral and radial locations of the applied weight's center of gravity are in error, even further affected by possible variations in the physical material and geometry of the imbalance correction weights not made known to the balancer system.

A vehicle wheel balancer system of the present disclosure is configured to prevent these errors by enabling the technician to provide the wheel balancer processor 23 with specific data identifying the geometric and mass distributive properties of the particular imbalance correction weights available for use, as well as the exact placement arrangement intended for use. For example, an operator may identify imbalance correction weight parameters such as the mass-per-length for an available type or style of imbalance correction weight during a setup procedure.

A vehicle wheel balancer system of the present disclosure preferably presents the operator with menu choices illustrating the required weight amounts together with the required placement arrangement for each available type or style, at the intended placement location on the wheel assembly. Since the vehicle balancer processor 23 is provided with data identifying the exact weight geometry, mass-per-length density, and occurrences of multiple rows of imbalance correction strip usage, the imbalance weight amount required at a particular placement location on the wheel assembly may actually differ between different types or styles of imbalance correction weights. For example a 4.75 oz. weight as a single long strip of weights placed end-to-end (as at 206c in FIG. 6) could change to 4.50 oz. for a selection choice using two shorter strips of imbalance correction weights placed side by side at the same angular location (as at 206b in FIG. 6). If a choice for an imbalance weight arrangement would alter the number of rows of weight strips used at any of the determined angular placement locations, all of the imbalance correction weight amounts and arrangements are re-calculated and displayed, allowing the operator to review the required new weight amounts and angles for all of the available types or styles of imbalance weights before any imbalance correction weights are applied to the wheel. For some applications, either the operator or the processor 23 of the vehicle wheel balancer system may select a mix of different imbalance correction weight types or styles for placement at selected locations.

Vehicle wheel balancer systems are commonly configured to operate with the assumption that the weight amount stamped or marked on an imbalance correction weight is an accurate measure of the actually weight amount, or at least that the manufacturers tolerance on the actual weight amount is negligible. However, some excessive manufacturer's tolerances have been noted to cause "weight chasing" when utilizing larger amounts of imbalance correction weight on a vehicle wheel assembly because the actual weight being applied is different from the marked notation by an amount approaching the smallest available weight increment. In order to compensate for excessive manufacturer weight tolerances, an operator may optionally provide the vehicle wheel balancer processor 23 of the present disclosure with an input which is representative of a determined inaccuracy of the particular imbalance correction weights being used, or this information may be provided in an accessible database. The processor 23 is configured with suitable software instructions to compensate for such determined inaccuracy during calculations of imbalance correction weight amounts and associated displays thereof.

Figure 9:
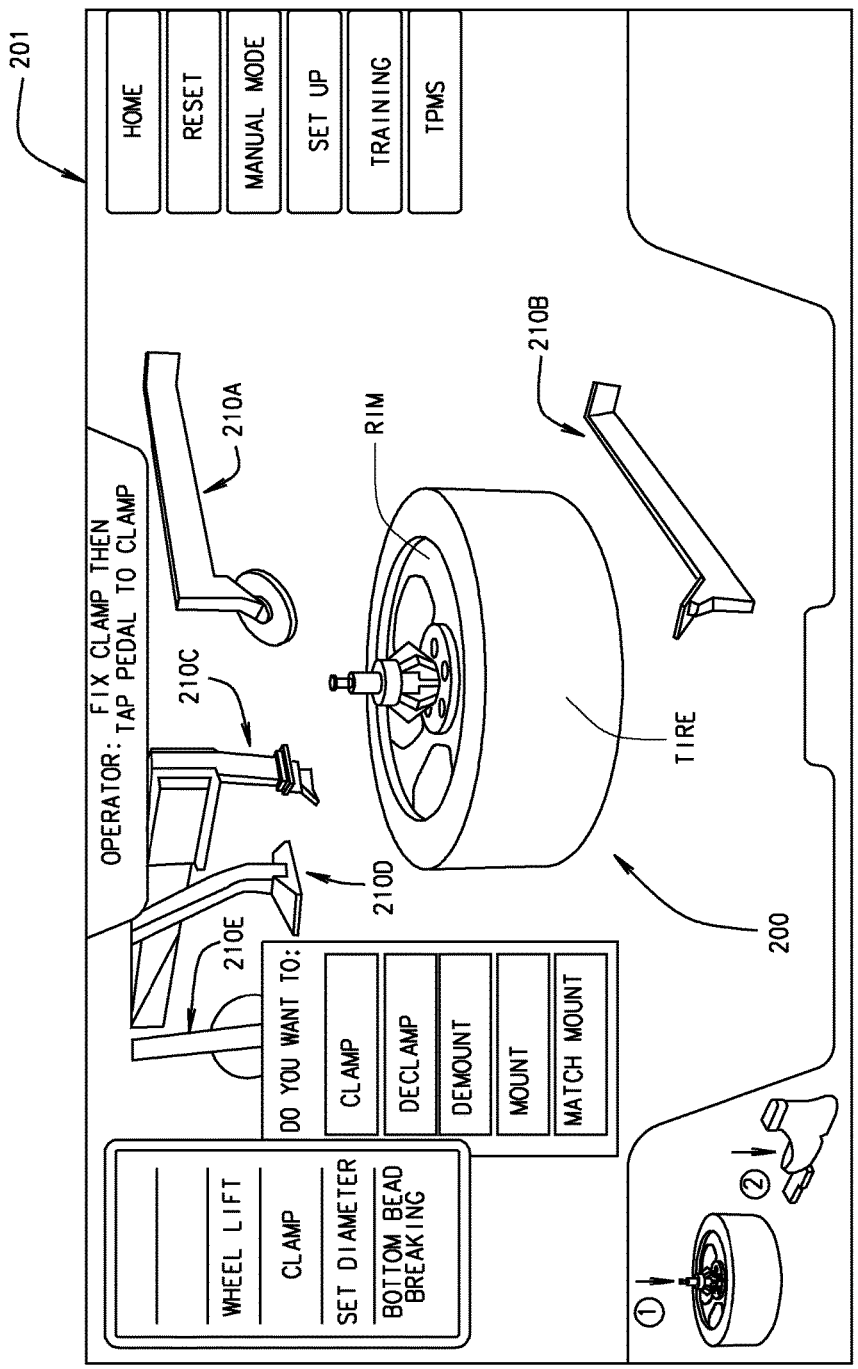
FIG. 9 is an exemplary display of a vehicle wheel assembly model for a tire changing system, illustrating components associated with a tire clamping operation.
Figure 10:
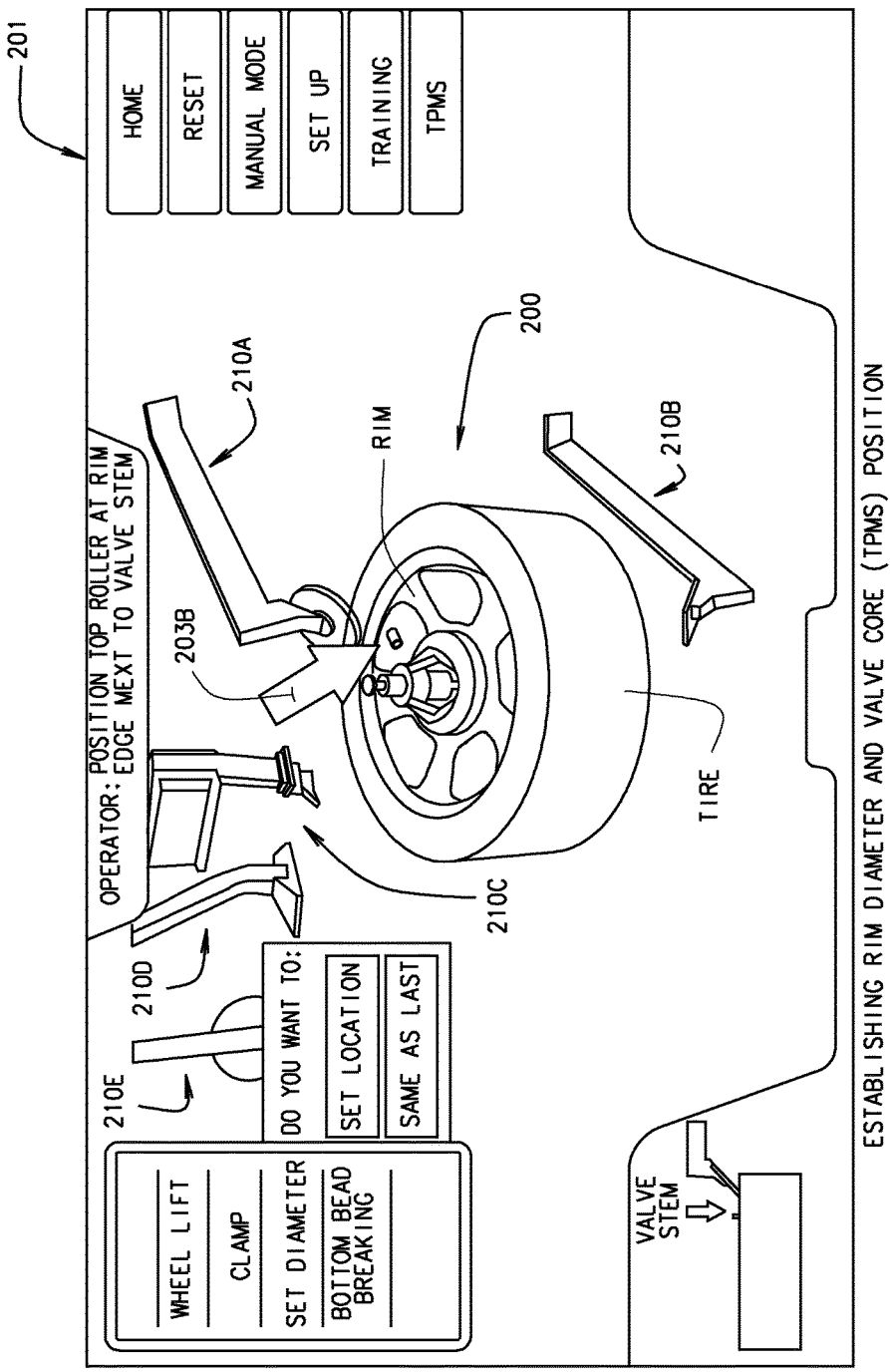
FIG. 10 is an exemplary display of vehicle wheel assembly model for a tire changing system, illustrating components associated with a procedure for establishing a wheel rim diameter and identifying a TPMS position.
Figure 11:
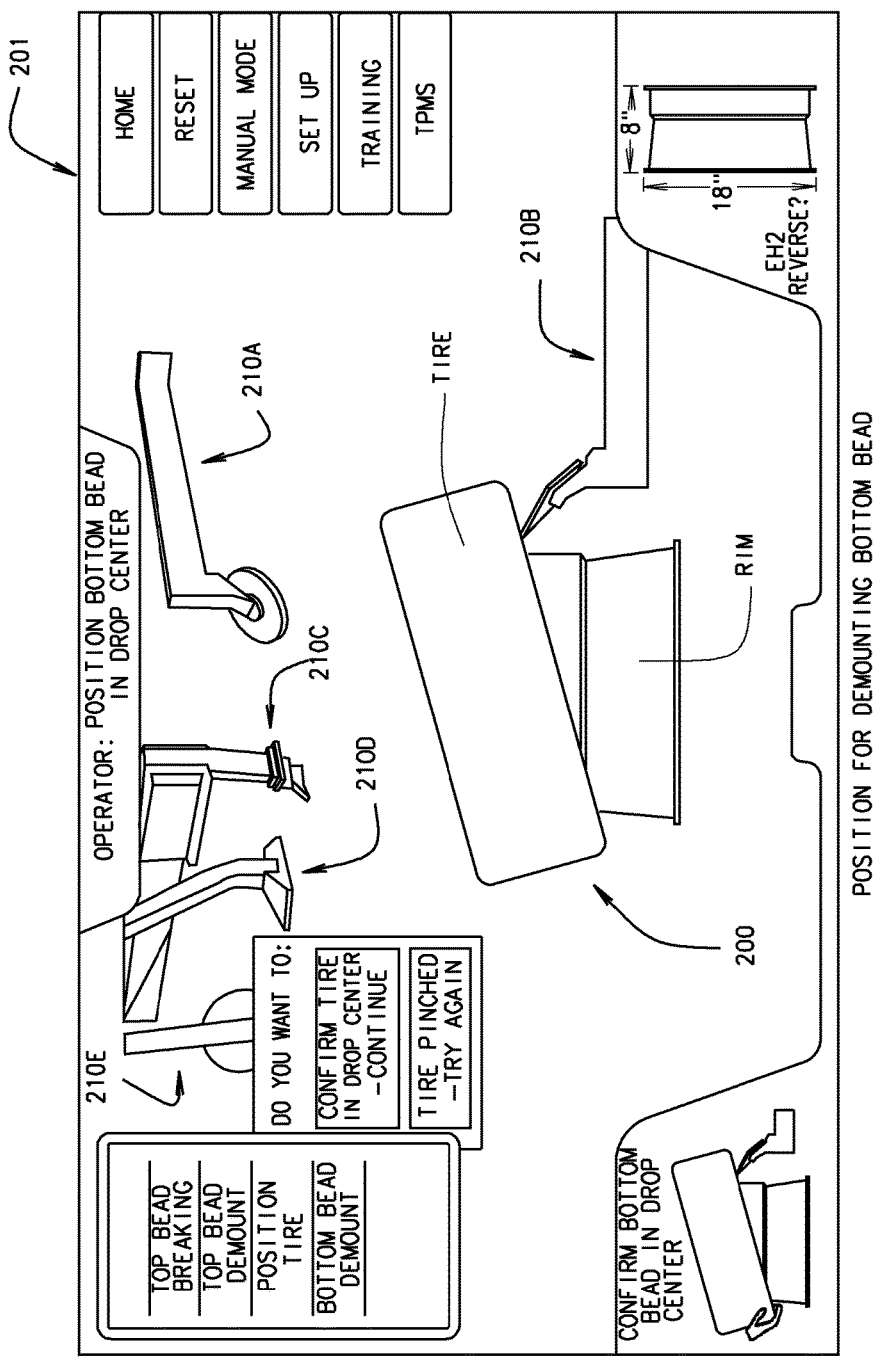
FIG. 11 is an exemplary display of a vehicle wheel assembly model for a tire changing system, illustrating a bead breaker position during demounting of a bottom tire bead.

Preferably, the processor 23 of the vehicle wheel balancing or vehicle wheel service system is configured with suitable software instructions to utilize accelerated graphics rendering software and graphics processing hardware to provide the operator with the two- or three-dimensional visual display 201 of the virtual model 200 illustrating the vehicle wheel assembly and interface controls, together with, but not limited to, imbalance correction weights, representations of runout, eccentricity, imbalance amounts and forces, and optionally, components of the vehicle wheel service system (shown as 210a-210d in FIGS. 9-11) which may interact with the vehicle wheel assembly, such as a load roller, laser pointer, tire manipulating tools, or dataset arms. As the service system hardware components or tools are moved in physical 3D space during operation, the processor 23 is configured to render representations of these components as part of the displayed virtual model 200, maintaining the same relative spatial relationships, such as seen in FIGS. 9-11.

A touch-screen display system is preferably utilized to present the visual display 201 to the operator, such that the operator may interact with the visual display 201 in real time to manipulate one or more of the displayed elements. For example, by interacting with a touch-screen display system (or via conventional mouse interface) as shown in FIGS. 6-11, the operator can select a displayed imbalance correction weight 206. The selected weight can be then dragged or repositioned to a new location on the model 200 of the vehicle wheel assembly by the operator. Similarly, the type of imbalance correction weight to be utilized may be changed by selection from a menu of available weight types, enabling the processor 23 to refresh the displayed wheel assembly model 200 to accommodate a new position of the updated imbalance correction weight, together with a revised representation of residual vibration forces (Road-Force™), runout effects, residual imbalance forces and/or imbalance correction weight parameters. Using suitable tough-screen gestures or interactions, the operator may "grab" and "rotate" the virtual model 200 of the wheel rim, relative to the mounted tire, (or vice versa) while observing the real-time effect a different rotational position would have on the overall imbalance of the wheel assembly. This enables an operator to visualize a resulting outcome prior to physically dismounting the actual tire from the wheel rim and re-mounting it at a different rotational position using a tire changing system.

Various components or elements presented in the virtual model environment may be selected by the operator, and moved or rendered in a transparent view, allowing visualization of features which might otherwise be obscured from view. For example, the tire component may be rendered in a transparent outline form on the interactive model display 201, allowing an operator to view imbalance correction weights 206 placed on the wheel rim in locations which would be otherwise obscured from view.

In addition to rotation and manipulation of the virtual model 200 in the interactive display 201 by the operator, the processor 23 may be configured with suitable software instructions to manipulate the interactive model 201 to provide a moving display, such as to illustrate the movement of the wheel assembly (rim and tire) in response to measured or calculated couple and static imbalance forces or vibration forces due to runout and/or force variation during rotation. It will be recognized that the vehicle wheel assembly characteristics shown in the display 201 to an operator by the processor 23 are not limited to those specifically set forth above, and that the displayed representation and/or data may be manipulated and rendered in a variety of different ways to present the operator with useful information during a vehicle wheel service procedure.

For example, solid and broken lines can be projected in virtual space to highlight the display of elements such as imbalance correction weights, and high and low force values associated with the tire. The lines can be rotated in the virtual space as the virtual model 200 of the tire and wheel assembly is rotated, fixing one end of the line to a point on the wheel/tire representation, and another to a label that appears stationary in the virtual space, allowing an operator to easily follow the identified point on the wheel/tire representation as the view is changed. Models 205 of imbalance correction weight styles 206a-c can be moved on and off the model of the wheel rim in virtual space to accentuate their proper placement. To adjust the placement and type of imbalance correction weights 206, the operator may indicate on the model 200, via the touch-screen display interface or other suitable input means, the location on which the imbalance correction weights are to be placed, as well as selecting the type of imbalance correction weight from a suitable menu, and the processor 23 will adjust the display accordingly to illustrate the operator's choice.

As previously noted, the present disclosure describes the utilization and display 201 of virtual models 200 composed of discrete elements intended for use with a variety of vehicle service systems. FIGS. 9 through 11 specifically illustrate an exemplary use an interactive display 201 of a wheel assembly virtual model 200 of the present disclosure in the context of a vehicle tire changing system, in which a wheel assembly is manipulated to physically mount, demount, or reposition a tire relative to a wheel rim. When utilized in the context of a vehicle tire changing system, it is preferred that the virtual models incorporate discrete components 210a-210d which illustrate mechanical components of the tire changing system for manipulating the tire and wheel rim. These tire manipulating tools include, but are not limited to, upper and lower bead breaker arms, tire hooks, dataset arms, pusher arms, and the rim mounting mechanism.

Such a virtual model 200 and interactive display 201 of the present disclosure may be utilized to facilitate a tire changing procedure in several ways. For example, the virtual display may be manipulated by a suitably configured processor of the vehicle tire changing system to animate movement of various displayed components 210a-210d to provide the operator with a real-time visual guide to follow when positioning manually actuated components of the tire changing system, as well as visualization of movements required to complete a procedure prior to implementation thereof. Alternatively, when the processor of the vehicle tire changing system is configured with suitable software instructions to receive positional data from sensors associated with various mechanical components of the tire changing system, the virtual model 200 shown on the display 201 can be correspondingly manipulated to render an accurate representation of real-time positioning and movement of the illustrated mechanical components 210a-210d, enabling the operator to view the procedure in real time from a safe location away from the moving parts. Similarly, the virtual model 200 may be manipulated by the tire changing system processor to illustrate on the interactive display 201 a mix of guidance steps and real-time positioning/movement, enabling the operator to proceed through the steps of a tire mount/dismount procedure, while observing both the actual mechanical components and the virtual model, such as shown at FIGS. 9 through 11.

With the virtual model 200 of the various discrete components and the vehicle wheel assembly, the presented view may be zoomed-in or out to illustrate and emphasize the relationships between critical or key illustrated components. This zoom feature may be controlled by the vehicle service system to occur automatically as components move near each other in real time, or may be manually selected by an operator. For example, when performing a bead breaking operation on a tire changer, the operator may desire to view how close the bead breaking tool is positioned relative to a valve stem or tire pressure monitoring sensor installed within the wheel rim. By utilizing a zoom feature to manipulate a real-time interactive display 201 of the wheel assembly and tire changing system model 200, the operator may observe the relative position of these components which may otherwise be hidden from view, or which would require the operator to be within the danger zone of moving equipment to directly observe, thereby increasing operator safety. Optionally, the vehicle service system may be configured to utilize the interactive nature of the display 201 to permit an operator to fine-tune positioning or movement of vehicle service system tools and mechanical components by manipulating the components of the virtual model 200 on the display 201. The fine-tuned positioning or movement is then replicated by the processor of the vehicle service system using the actual vehicle service system tools or mechanical components.

It will be further recognized that the visual display 201 of the virtual model 200 may include multiple views of the virtual model 200 simultaneously. For example, the visual display 201 may present the operator with wide scale view of the virtual model 200, illustrating the relative spatial positions of the wheel assembly components in the environment of the vehicle service device, as well as a zoomed-in view illustrating a close-up of a point of engagement between a tire manipulating tool and a tire mounted to the wheel rim which is also visible in the wide-scale view. Alternatively, more than one virtual model 200 may be presented in the visual display 201 simultaneously, for example, on a vehicle wheel balancing system, when balancing a set of vehicle wheel assemblies, the visual display 201 may provide the operator with a virtual model which is representative of each vehicle wheel assembly in the set which has been balanced, allowing the operator to visually compare the end result of each vehicle wheel balancing operation, as may be useful for selecting a placement location about the vehicle for each wheel assembly.

The present disclosure can be embodied in-part in the form of computer-implemented processes and apparatuses for practicing those processes. The present disclosure can also be embodied in-part in the form of computer program code containing instructions embodied in tangible media, or another computer readable storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for presenting in a vehicle wheel assembly service system, a visual display of information associated with a vehicle wheel assembly secured to the vehicle wheel assembly service system, the wheel assembly consisting of a wheel rim and a tire optionally mounted there upon, comprising:
   measuring one or more parameters associated with the wheel assembly secured to the vehicle wheel assembly service system;
   rendering a virtual model of at least the vehicle wheel assembly for visual display to an operator, said virtual model consisting of a plurality of discrete components which are interactively configured together and rendered for display in response to said one or more measured parameters associated with the wheel assembly, and in response to operator input;
   altering a relative rotational position between discrete components representing a tire within said virtual model and discrete components representing a wheel rim within said virtual model, without actually altering a relative rotational position between said tire and said wheel rim of said vehicle wheel assembly secured to the vehicle wheel assembly service system;
   presenting said rendered virtual model in a visual display to said operator to illustrate said one or more measured parameters and said altered relative rotational position of said wheel rim and tire discrete component representations; and
   wherein said one or more measured parameters include at least one parameter selected from a set of parameters including wheel spoke data, wheel assembly runout, wheel rim runout, tire runout, wheel rim imbalance forces, tire imbalance forces, imbalance correction weight placement locations on said wheel assembly, imbalance correction weight amounts, non-uniformity vibrations, and tire stiffness.

2. An improved vehicle wheel service system comprising:
   a computer configured to render a virtual model which is representative of a plurality of measured parameters associated with components of an actual vehicle wheel assembly undergoing a service procedure;
   a load roller under control of said computer to selectively apply radial loads to said vehicle wheel assembly;
   wherein the computer is further configured to present on a display device, a visual display of information associated with the actual vehicle wheel assembly using the virtual model of the vehicle wheel assembly, said visual display of said virtual model including a representation of said plurality of measured parameters;
   wherein said plurality of measured parameters include at least a measure of tire stiffness and a measure of rim runout; and
   wherein said virtual model includes a representation of said tire stiffness in relation to said rim runout for said vehicle wheel assembly by incorporating a visual representation of said tire stiffness into a tire component of said virtual model and a visual representation of said rim runout into a rim component of said virtual model.

3. The improved vehicle wheel service system of claim 2 wherein the presented visual display of the virtual model on the display device is interactive, and wherein said computer is configured to alter one or more components of said virtual model presented in said visual display in response to operator instructions received via an operator interface.

4. The improved vehicle wheel service system of claim 2 wherein said one or more measured parameters further include at least one parameter selected from a set of parameters including imbalance correction weight styles, imbalance correction weight characteristics, and spatial relationships between service system components and the wheel assembly.

5. The improved vehicle wheel service system of claim 2 wherein said computer is further configured to alter said rendered virtual model in response to a change in a rotational relationship between the wheel rim and tire of the wheel in the virtual model or to an operator selection changing an imbalance correction weight type, style, placement arrangement, or weight variance rendered in the virtual model;
   wherein said computer is further configured to alter said rendered virtual model to revise at least one of a display of imbalance correction weights, a display of assembly runout, a display of force variations, or a display of tire uniformity variations in response to said change or selection; and
   wherein said computer is further configured to update said visual display of information associated with the actual vehicle wheel assembly using the altered virtual model of the vehicle wheel assembly, without altering said vehicle wheel assembly undergoing said service procedure.

6. The improved vehicle wheel service system of claim 2 wherein said computer is configured to alter a view of said virtual model presented in said visual display to visually emphasize a relationship between a plurality of elements within said virtual model.

7. The improved vehicle wheel service system of claim 6 wherein said computer is configured to alter said view during said wheel assembly service procedure in response to a change in a physical location of a vehicle service system tool associated with said vehicle wheel assembly.

8. The improved vehicle wheel service system of claim 6 wherein said computer is configured to alter said view by either altering a presentation viewpoint for said virtual model, altering a scale of said virtual model, or rendering portions of said virtual model transparent or invisible.

9. The improved vehicle wheel service system of claim 2 wherein said computer is configured to alter a view of said virtual model presented in said visual display to visually illustrate an action required for one or more steps in said service procedure before actual implementation thereof.

10. The improved vehicle service system of claim 2 wherein said computer is further configured to re-rendering for display at least one of said discrete components within said virtual model for presentation in response to a change in said one or more measured parameters associated with the actual vehicle wheel assembly undergoing said service procedure.

* * * * *